United States Patent
Deppe

(10) Patent No.: US 8,355,033 B2
(45) Date of Patent: Jan. 15, 2013

(54) METHOD OF ADJUSTING THE LIGHT OUTPUT OF A PROJECTOR SYSTEM, AND SYSTEM FOR ADJUSTING THE LIGHT OUTPUT OF A PROJECTOR SYSTEM

(75) Inventor: Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 455 days.

(21) Appl. No.: 12/519,435

(22) PCT Filed: Dec. 17, 2007

(86) PCT No.: PCT/IB2007/055182
§ 371 (c)(1),
(2), (4) Date: Jun. 16, 2009

(87) PCT Pub. No.: WO2008/078278
PCT Pub. Date: Jul. 3, 2008

(65) Prior Publication Data
US 2010/0033516 A1 Feb. 11, 2010

(30) Foreign Application Priority Data
Dec. 22, 2006 (EP) .................................... 06127050

(51) Int. Cl.
*G09G 5/10* (2006.01)
(52) U.S. Cl. ....................................... 345/690; 345/589
(58) Field of Classification Search .................... 345/84, 345/102, 90, 691, 59, 589, 690; 348/771, 348/744; 353/85; 359/264, 290, 298
See application file for complete search history.

(56) References Cited

U.S. PATENT DOCUMENTS

| 5,903,323 | A | 5/1999 | Ernstoff et al. |
| 5,986,721 | A * | 11/1999 | Jones et al. ................. 348/743 |
| 7,064,740 | B2 * | 6/2006 | Daly .............................. 345/102 |
| 2002/0060753 | A1 | 5/2002 | Flint |
| 2005/0184938 | A1 * | 8/2005 | Hewlett et al. ................. 345/84 |
| 2005/0243282 | A1 | 11/2005 | Peterson et al. |
| 2006/0181653 | A1 | 8/2006 | Morgan |
| 2006/0197469 | A1 | 9/2006 | Kim |
| 2007/0064007 | A1 * | 3/2007 | Childers et al. ............... 345/589 |

FOREIGN PATENT DOCUMENTS

| EP | 0889458 A2 | 1/1999 |
| WO | WO 2006114742 A2 | 11/2006 |

* cited by examiner

*Primary Examiner* — Quan-Zhen Wang
*Assistant Examiner* — Charles Zheng
(74) *Attorney, Agent, or Firm* — Kenneth E. Kozik; Mark L. Beloborodov

(57) ABSTRACT

Disclosed is a method for adjusting light output of a projector that includes compiling a switching sequence having long and short segments for the controllable elements of a display unit, a long segment being of a duration greater than or equal to a threshold and a short segment being of a duration less than the threshold; obtaining a light output adjustment measure by which the light output is to be adjusted; generating a light pulse sequence such that the duration of a light pulse corresponds to the light output adjustment measure; and arranging the light pulse relative to the switching sequence such that the activation of the light pulse does not occur during a short segment, wherein the predefined threshold is a time duration of the light pulse at a lowest dimming level such that the light pulse has settled by the time the long segment ends.

11 Claims, 8 Drawing Sheets

METHOD OF ADJUSTING THE LIGHT OUTPUT OF A PROJECTOR SYSTEM, AND SYSTEM FOR ADJUSTING THE LIGHT OUTPUT OF A PROJECTOR SYSTEM

This invention relates to a method of adjusting the light output of a projector system, and to a system for adjusting the light output of a projector system. The invention further relates to a light source driving arrangement for a light source in a projector system, to a display unit controller for controlling a display unit of a projector system, and to a projector system.

With continued developments in the field of semiconductors and optics, projectors and rear-projection televisions are becoming more affordable and therefore more popular for use in a home environment. An example of such a development is given by Digital Light Processing (DLP®), a technology developed by Texas Instruments® for use in projectors. Using DLP®, an image is created by reflecting or deflecting light off a display unit comprising an array of microscopically small mirrors mounted on a semiconductor chip. Such a display unit is termed a digital micro-mirror device, or DMD®. The mirrors can be individually controlled to toggle between an 'on' and an 'off' position, and each mirror corresponds to a picture element or 'pixel' in the projected image. In the 'on' position, incoming light from the light source is reflected towards the projection area, and in the 'off' position, the light is deflected into a light sink so that no light is directed at the projection area for that corresponding pixel. Another type of display unit can comprise an array of 'light valves' which can be open or shut, allowing light to pass through, or blocking light from passing through. The controllable elements of such a display unit can also be switched rapidly to alter the resulting brightness or intensity of the corresponding pixel. Owing to the reaction time of the human eye, a viewer does not actually perceive the switching of the controllable elements of such display units.

The intensity, or perceived brightness, of a pixel in an image or video frame is controlled by rapid switching of the corresponding element during the video frame time, where the video frame time is the duration of a single frame in a video sequence. For example, the 'on' and 'off' positions for a mirror during a video frame time can be determined by a binary number or control sequence for that mirror, in which a value of '1' generally indicates 'on', i.e. the light is reflected by the mirror onto the projection area, while a value of '0' indicates 'off', so that the light is deflected into a light sink. The number of bits in the binary number is ultimately determined by the video frame time and the minimum length of time required for a mirror to switch between 'on' and 'off'. A pulse-width modulation is usually applied in prior art applications so that 'higher-level' bits of the binary number (those bits closer to the most significant bit, or MSB) are accorded longer durations in a video frame than 'lower-level' bits (those bits closer to the least significant bit, or LSB). For example, the MSB can be accorded approximately one half of the entire video frame time. The next bit is accorded approximately one quarter of the video frame time, the following bit is accorded one eighth, etc.

The majority of projector systems in use up until the present time are based on the use of a light source that can only emit white light, making it necessary to employ a colour wheel with red, green and blue filters to generate images in red, green and blue, which are then combined to give an overall colour image. An obvious disadvantage of such a projector system is the complex and expensive components required for obtaining a coloured image, and the fact that the colour filters absorb some of the light, so that the light source must provide a greater light output than actually required for the image. Furthermore, the gas-discharge lamps usually in use until now are expensive, have a limited lifetime and are vulnerable to damage arising from overheating, incorrect handling, or the blackening that can arise when the lamp is dimmed, for example during a dark video sequence.

Advances in light emitting diode (LED) and semiconductor laser technologies make it possible to have independent red, blue and green light sources in a projector system, so that there is no longer a need for a colour wheel and the other complex components required for generating a coloured image using a white light source. Furthermore, semiconductor LED and laser light sources are compact and have a relatively long lifetime, so that these solid-state light sources are also attractive from a consumer's point of view.

The image produced by a projector should be able to be dimmed, for example in a dark film sequence, whilst still maintaining the overall image quality. However, the display unit can only be used to dim the image to a certain extent while maintaining a high level of image quality. Since a number of bits, usually higher-level bits, must be 'sacrificed' to dim the image by turning off the corresponding elements in the display unit, less bits remain available for describing the image brightness. Therefore, an image dimmed only with the display unit is generally characterised by a loss in dynamic and contrast. Adjustment of the net light output is generally achieved by using both by the display unit, which controls the amount of light that is allowed to pass through to the projection area, and also the light source, which is dimmed or un-dimmed to control the amount of light that is actually output by the light source itself. The usual type of gas-discharge projector lamp can be dimmed and un-dimmed without significant alteration of its colour point, i.e. there is little or no resulting distortion of the image colour. Such a lamp can be dimmed by reducing the current through the lamp. However, when a solid-state light source such as an LED is dimmed by reducing the current through the device, the colour point of the resulting light is altered, so that a dimming using the conventional approach is not satisfactory. One way of dealing with this problem can be to reduce the LED light output by rapidly switching the LED on and off during a video frame time, a technique which can be used in a projector system using an analogue display such as an LCD (liquid crystal display), or LCoS (Liquid Crystal on Silicon) display, or in a projector system using a white LED and a colour wheel. However, this technique of LED dimming gives rise to timing conflicts when used in conjunction with a display unit whose elements are also rapidly switched during a video frame. Furthermore, the switching characteristics of a cost-effective LED driver circuit are such that when the LED is switched on, relatively strong fluctuations in light output occur during an initial time, so that the resulting light output can be falsified during that time.

Therefore, an object of the present invention is to provide a way of dimming a solid-state light source while avoiding the problems outlined above.

To this end, the present invention provides a method of adjusting the light output of a projector system comprising a light source and a display unit with controllable elements for controlling the path of the light originating from the light source, which method comprises compiling a switching sequence for the controllable elements of the display unit, which switching sequence comprises a pattern of long segments and short segments, whereby a long segment is of a duration greater than or equal to a predefined threshold and a short segment is of a duration less than or equal to the predefined threshold. A light output adjustment measure is obtained, giving the amount by which the light output of the light source is to be adjusted, and a light pulse sequence is generated such that the duration of a light pulse of the light pulse sequence during a segment of the switching sequence corresponds to the light output adjustment measure, and the light pulse is arranged relative to the switching sequence such that the activation of the light pulse does not occur in a short segment.

The method according to the invention can generally be applied to any type of light source, such as a gas-discharge lamp. However, the method is preferably applicable to a light source comprising a number of solid-state light sources, for example, one or more LEDs or laser diodes. The term 'solid-state' is generally used to refer to a semiconductor component. In the following, for the sake of simplicity, it is assumed that the light source comprises one or more LEDs, without restricting the scope of the invention in any way. The display unit at which the light is directed can be a DMD® as described above, or can be any other suitable type of display unit such as an array of light valves. In the following, for the sake of simplicity, it is assumed that the display unit is a digital micro-mirror device, again without restricting the invention in any way.

To better distribute the net light for an image pixel during a video frame, the longer, or higher-level, bit durations can be subdivided into segments. Shorter, or lower-level, bit durations can be left whole, so that such a segment comprises the corresponding bit. The arrangement of the 'long' and 'short' segments gives a switching sequence, whereby the classification of a segment as 'long' or 'short' is done according to a predefined threshold, which will be explained in more detail below. Any segment whose duration is less than a predefined threshold is classified as a 'short' segment, whereas any segment of a duration longer than the predefined threshold is classified as a 'long' segment.

As already described, the brightness of a projected image can be controlled by decreasing or increasing the light output of the light source. In the method according to the invention, the measure by which the light output is to be adjusted, i.e. the light output adjustment measure, can be a signal representing a value, for example a percentage such as 50%, 25%, 20%, etc., and can directly or indirectly influence the amount of light that is to be output by the light source.

According to the invention, a sequence of light pulses is generated by alternately activating and deactivating the light source during a video frame time such that the net activation time of the light source corresponds to the light output adjustment measure, and the activation and deactivation of the light source is synchronised according to the switching sequence so that, if a short segment is concerned, the activation of the light source does not occur within a short segment of the switching sequence.

An obvious advantage of the method according to the invention is that the light source is switched in a manner synchronous to the switching sequence of the display unit, so that there is no conflict between the switching times of the lamp and the switching times of the controllable elements of the display unit. Furthermore, by arranging the light pulses such that these are only deactivated, and not activated, during a short segment, the net light output for a pixel during a video frame time will not be falsified or distorted by the fluctuations in light output that arise directly after switching on. Furthermore, since the light source can be dimmed while being operated at constant current, the colour point of the light source is preserved.

An appropriate system for adjusting the light output of a projector system comprising a light source and a display unit with controllable elements for controlling the path of the light originating from the light source comprises a switching sequence compiler for compiling a switching sequence for the controllable elements of the display unit, which switching sequence comprises long segments and short segments, whereby a long segment is of a duration greater than or equal to a predefined threshold and a short segment is of a duration less than or equal to the predefined threshold. A light output adjustment measure by which the light output of the light source is to be adjusted is obtained via an interface of the system. The system further comprises a light pulse sequencer for generating a light pulse sequence such that the duration of a light pulse of the light pulse sequence during a segment of the switching sequence corresponds to the light output adjustment measure, and for arranging the light pulse relative to the switching sequence such that the activation of the light pulse does not fall within a short segment of the switching sequence.

The dependent claims and the subsequent description disclose particularly advantageous embodiments and features of the invention.

As mentioned in the introduction, the switching characteristics of a light-emitting diode and its driver circuit (e.g. a switched-mode power supply such as a buck converter) are such that relatively strong oscillations might occur for a time directly after switching on, since the current needs some time to stabilize to the required level. The light output of the LED therefore oscillates or fluctuates about the level to which the light output ultimately settles. These oscillations only occur after switching the LED on, and, for a particular voltage level and a particular current, the extent and duration of the oscillations of the light output of the LED are essentially the same every time it is switched on. A comparatively 'clean' switch-off of the LED, i.e. in which the light output drops sharply to zero, essentially instantaneously and without any oscillations, can easily be achieved with a minor addition to the circuitry, such as a MOSFET switch. The duration of the switch-on oscillations can be measured for a particular LED light source, so that a pulse-width threshold can be determined. In the method according to the invention, the light pulses of the light pulse sequence are arranged such that, in a short segment of the switching sequence, only the deactivation of the light pulse occurs, the reason being that any oscillations in the light output should not fall within a short segment, where they could result in a falsification of the net light output, since it may be that the switch-on oscillations of the light source persist for a length of time longer than the time allocated to a short bit of the switching sequence. Therefore, in a preferred embodiment of the invention, these switching characteristics, also functional or operational characteristics, determine the threshold for classification of the segments of the switching sequence into 'long' or 'short'.

At full light output, the LED can be said to be operating at 100%, meaning that at least one colour of the LED is turned on, or active, for the entire video frame time. The 'dimming' effect is achieved in the method according to the invention by pulsing the light source to switch between 'on' and 'off' according to the light output adjustment measure. To dim the light source by 50%, for example, the light pulse sequencer switches the LED on and off so that light pulses are generated for a net duration of 50% of the video frame time. Since the LEDs are operated at constant current, the actual brightness of the LED remains essentially unchanged and the colour point of the light source is preserved. To dim by 25% of full light output, the LED light pulses are generated so that the net duration of the 'on' pulses comprises 25% of the video frame time. Dimming the light output by pulsing the light source can therefore be regarded as performing a pulse-width modulation of the light output. The predefined threshold for classifying segments of the switching sequence into 'long' or 'short' is governed to a certain extent by the light output adjustment measure, since there may be a lower limit to the width of the light pulse that can be generated by switching the light source on and off. This minimum pulse width may be different for different light sources, and/or light source drivers. If the minimum pulse width of a light source is relatively long, therefore, it may be necessary to classify more of the lower-level bits of the switching sequence as 'short' segments. For a relatively short minimum light pulse width, more of the segments can be classified as 'short'.

Furthermore, these light pulses are synchronised, as already described, to the switching sequence, so that each segment of the switching sequence is 'covered' by at least part of a light pulse. Visually speaking, the light pulses of the light pulse sequence are disposed with respect to the segments of the switching sequence such that a fraction of the segment corresponding to the light adjustment measure is 'covered' by part of a light pulse. In other words, if the light output is to be dimmed to 50%, then half of each segment is 'covered' by a light pulse. When dimming to 75%, the light pulses are correspondingly longer, so that three quarters of each segment will be 'covered' by a light pulse, and so on. Evidently, a long segment will be covered by more of the light pulse than its neighbouring short segment. Equally, if a long segment is followed by another long segment of the same length, each of these two segments will be covered by the same amount of the light pulse.

There may be a lower limit to the dimming capabilities of the LED, since the minimum width of a light pulse is ultimately governed by the duration of the settling time, or oscillations, that occur during switching on, and these oscillations are not to lie within a short segment. Ultimately, the duration of the shortest light pulse can be at least twice the duration of the oscillation phase of the light source.

Although the light output of the light source can briefly fluctuate or to a relatively large extent about its rated light output level, the effect of these fluctuations is not noticeable to a user when they occur during a sufficiently long segment of the switching sequence, because the overall light output for this segment will be perceived by a viewer to be averaged out. However, if these fluctuations were to fall within short segments of the switching sequence, their effect would indeed be noticeable, since the resulting brightness level of the image would be falsified. Therefore, in a particularly preferred embodiment of the invention, the activation of the light pulse occurs during a long segment of the switching sequence. In this way, it is ensured that any fluctuations in light output are averaged out in a long segment, and the 'clean' switch-off takes place in a short segment.

As already indicated above, when the light source is dimmed, the fraction of the light pulse that covers a segment of the switching sequence corresponds directly to the light adjustment measure, i.e. to the fraction of full light output. It follows that, in the method according to the invention, the light source is pulsed so that it is switched on during one segment and switched off during the following segment, since the light pulse may not 'cover' an entire segment. In a particularly preferred embodiment of the invention, therefore, the switching sequence is preferably compiled so that it comprises long segments followed by short segments, so that the light source can always be switched on during a long segment and 'cleanly' switched off during the following short segment. In other words, a short segment of the switching sequence is preferably always preceded by a long segment.

To provide a more satisfactory image rendering, the pulse-width modulated bits of the control sequence for each display element can be sub-divided and rearranged, so that the bit value of a 'long' bit is distributed over the frame time. Since a bit in the control sequence represents a duration of time for which the mirror is 'on' or 'off', sub-dividing and rearranging the bits of the control sequence will not alter the net time that a mirror element is 'on' or 'off', but will simply distribute the 'on' and 'off' times more evenly over a video time frame, giving a more satisfactory image rendering from a user's point of view. For example, the most significant bit, or highest-value bit, can be divided evenly into n segments, and the following bit, which is effectively half as 'long' as the highest-value bit, can be divided evenly into n/2 segments, and so on, until a bit is reached whose 'length' is shorter than a predefined threshold, in which case that bit is not further divided. All bits that were subdivided yield 'long' segments, and all bits that are too short to be sub-divided yield 'short' segments. The long and short segments can then be re-arranged, for example by alternating long and short segments evenly over the entire video frame time, so that the mirror element of the display unit can then be switched considerably more often during a video time sequence. This serves to average out the effect of a 'long' bit.

The switching sequence of the display unit may be predefined by the manufacturer, and may not necessarily comprise alternating long and short segments as proposed above. For example, a switching sequence may comprise a series of long segments followed by a series of short segments. In such a switching sequence, it may be that groups of short segments are preceded by a pause or interval in which nothing happens, and in which the mirrors of the display are switched to their 'off' position. In this case, the light pulses of the light source can be arranged with respect to the switching sequence in a manner different to that already described. For example, an entire light pulse can be arranged to lie symmetrically about the centre of each long segment, so that the light pulse is switched both on and off in the long segment, and each long segment is 'covered' by the amount of the light pulse corresponding to the light adjustment measure. Then, in an interval preceding a group of short segments, the light source is preferably switched on so that the oscillations of the light pulse occur during the interval preceding the short segment group, and the light pulse is switched off during a short segment. The switch-on time is chosen so that the fraction of the light pulse that covers the short segments corresponds to the light adjustment measure.

As mentioned earlier, a light source for use in the method according to the invention can comprise a number of different coloured individual light sources. Each of these light sources is switched on or off according to the invention for a net duration that corresponds to the light output adjustment measurement, and the different coloured images—red, green and blue—are perceived by the user to be an overall image. The red, green and blue images can be generated sequentially in a video time frame, so that a single red image, a single green image, and a single blue image are generated in one video time frame. However, a superior image quality is obtained when more coloured images are generated within a single video time frame. Therefore, in a particularly preferred embodiment of the invention, switching sequences for a plurality of different coloured light sources are interleaved to give a combined switching sequence. Since the switching sequences for each of the different coloured light sources are compiled in the same way, it follows that the switching sequences are effectively identical, apart from minor differences to achieve a desired colour balance. These can then be interleaved by simply arranging identical groups of consecutive segments from the different switching sequences. This will be graphically explained in the description of the figures.

A light source driving arrangement for a light source in a projector system comprises an interface for obtaining a light output adjustment measure by which the light output of the light source is to be adjusted, an interface for obtaining a switching sequence of a display unit of the projector system, which switching sequence comprises long segments and short segments, and a light pulse sequencer for generating a light pulse sequence such that the duration of a light pulse of the light pulse sequence during a segment of the switching sequence corresponds to the light output adjustment measure, and for arranging the light pulse relative to the switching sequence such that the deactivation of the light pulse occurs during a short segment of the switching sequence.

Such a light source driving arrangement could be realised as a separate entity, and could be designed for use in conjunction with one or more different types of display units, and may be supplied as a component to a projector system manufacturer to obtain a light output adjustment system according to the invention in a projector system.

The switching sequence for a display unit can be supplied by the manufacturer of the display unit, which might comprise a DMD® and an associated processor along with other electronic components required for correct operation of the display unit. A display unit intended for use with light source driving arrangements from other manufacturers will likely be supplied with a suitable interface by means of which commands or signals can be issued and/or received by the light source driving arrangement comprising a compatible interface. Such signals might include periodic synchronisation signals so that the light pulse sequencer can synchronise its output to the switching sequence for the display unit. Alternatively, the switching sequence might be generated by a switching sequence compiler of a light output adjustment system according to the invention. Such a compiler can be a software module or algorithm for compiling a suitable switching sequence according to operational parameters such as the number of different coloured light sources, whether switching sequences for separate light sources are to be interleaved, the rate at which the controllable elements of the display unit of the system can be switched, etc.

An interface for obtaining a light output adjustment measure can, for example, comprise a signal from image rendering algorithms that process the image data and determine, in advance, whether the overall light output level for a video sequence should be increased or decreased, and by what amount, and what proportion of the light adjustment is to be performed by the light source. The light adjustment measure for a video frame time or video frame sequence can be specified to the light source driving arrangement by, for example, a signal indicating the amount by which the light output must be dimmed. Such a signal might comprise a binary value representing the amount by which to reduce or increase the light output, or may indicate, by means of a voltage level, the fraction of full light output that is required. Equally, such an interface can also comprise a user input, for example when the user adjusts the overall light output of the projector system by means of an appropriate button or knob.

The light pulse sequencer for a light output adjustment system might be a software module, running on a suitable processor, which interprets the light output adjustment measure to determine the width of the light pulses and therefore also the times at which the light source or light sources are to be switched on and off.

In an alternative preferred embodiment, a display unit controller for controlling a display unit of a projector system can comprise an interface for obtaining video data and a switching sequencer for generating a switching sequence for the display unit of the projector system based on the video data. As described above, the switching sequence can comprise long segments and short segments. Such a display unit controller can also comprise an interface for obtaining a light output adjustment measure by which the light output of a light source of the projector system is to be adjusted. The interface can obtain a light output adjustment measure from the video data, or also from an external control of the projector system. Alternatively, instead of a single interface, two interfaces can be realised, one for obtaining a light output adjustment measure from the video data, and one for obtaining a light output adjustment measure from an external source such as a control knob of the projector system. The display unit controller also comprises a light pulse sequencer for generating a light pulse sequence control signal for the light source such that the duration of a light pulse of the light pulse sequence during a segment of the switching sequence corresponds to the light output adjustment measure, and for arranging the light pulse relative to the switching sequence such that the activation of the light pulse does not occur during a short segment of the switching sequence. A suitable signal output of the display unit controller can supply the light pulse sequence control signal to a separate light source driving arrangement, which in turn uses the light pulse sequence control signal to generate a light pulse sequence to control the light source.

Other objects and features of the present invention will become apparent from the following detailed descriptions considered in conjunction with the accompanying drawings. It is to be understood, however, that the drawings are designed solely for the purposes of illustration and not as a definition of the limits of the invention. In the drawings, like reference denote the same objects throughout.

The dimensions of objects in the figures have been chosen for the sake of clarity and do not necessarily reflect the actual relative dimensions. Objects in the diagrams are not necessarily drawn to scale. In the diagrams, like numbers refer to like objects throughout.

Figure 1:
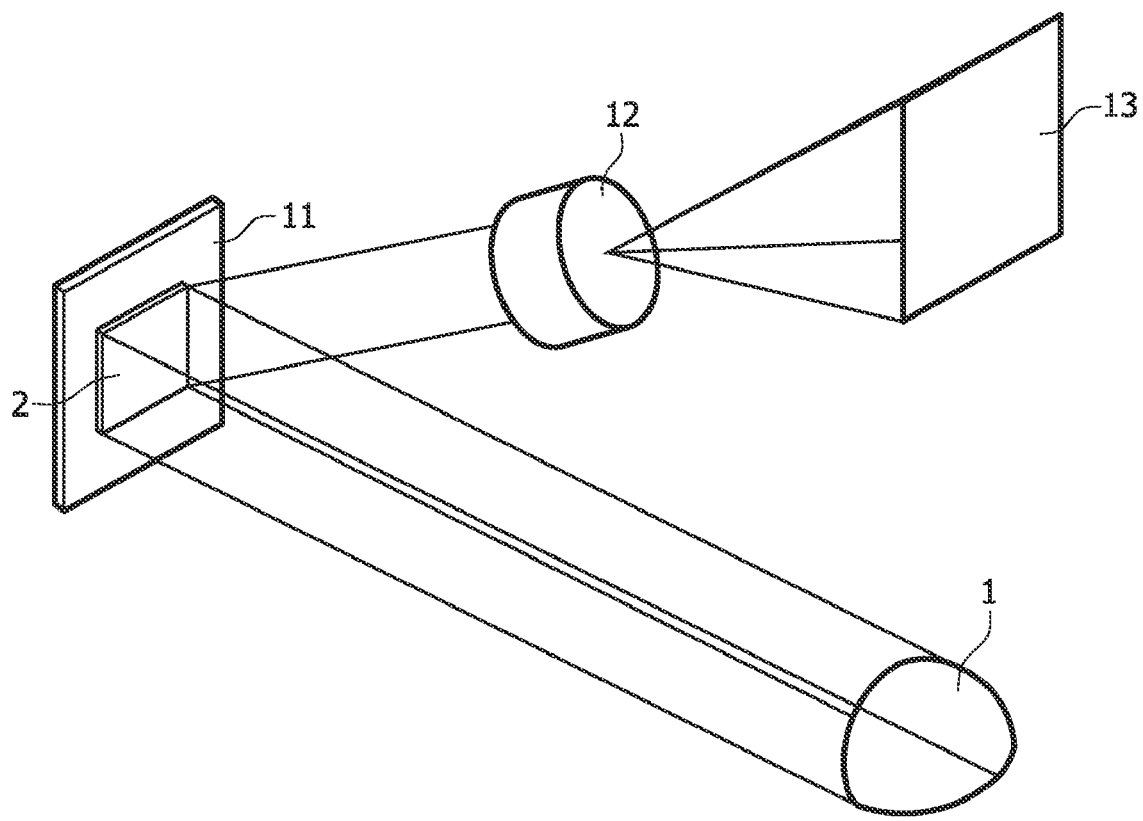
FIG. 1 shows relevant elements of a prior art projector system using a solid state light source.

FIG. 1 shows the parts of a projection system most relevant for the following discussion. Here, an LED light source 1 generates light which is directed at a display unit 2 mounted on a carrier 11. The display unit 2 is controlled in a manner which will be explained under FIG. 2, so that the light is either deflected into a light sink (not shown in the diagram), or reflected in the direction of a projector lens 12. The projector lens 12 focuses the light so that it can be projected evenly onto a projection area 13 such as a backdrop, screen, or LCD display (the projection area 13 will generally be much larger than that shown in the diagram). For the sake of clarity, only these relevant components have been shown, and it will be understood that suitable control electronics and drivers are required for the operation of such a system.

Figure 2:
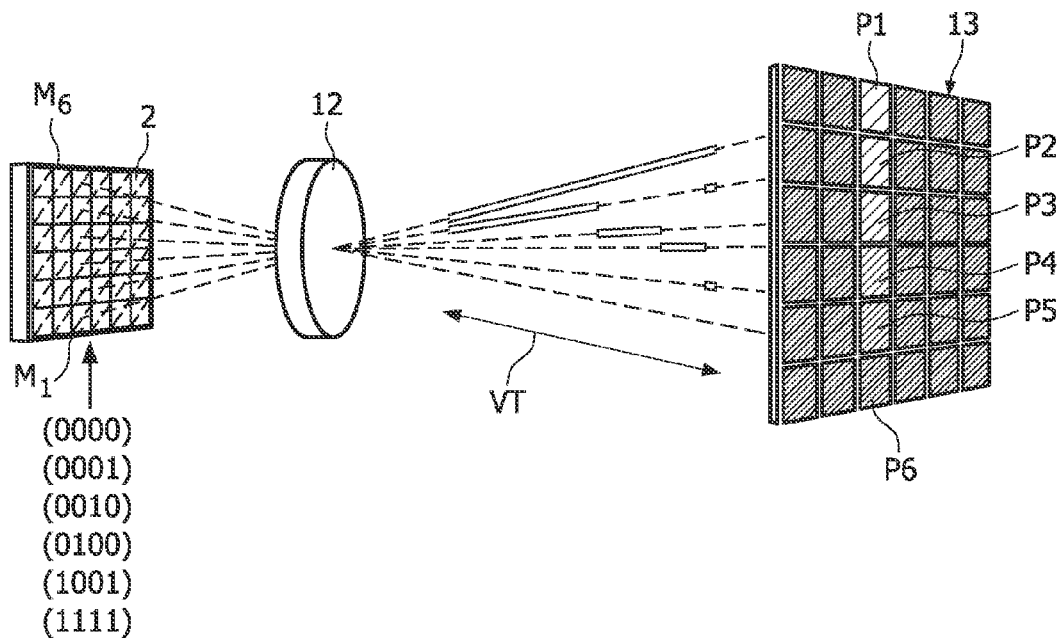
FIG. 2 shows relevant elements of a display unit and corresponding pixels of an image.

FIG. 2 shows the display unit 2 in more detail. The display unit 2 shown here comprises an array of microscopically small mirrors, such as a digital micro-mirror device (DMD®) by Texas Instruments®, with which any image can be generated and with which, for example, video frames can be rendered. Such a display unit can comprise hundreds of thousands, or even millions, of microscopically small mirrors arranged in a regular array. Each mirror of the array is associated with a corresponding pixel or part of the image that is projected onto the projection area, not shown in the diagram, and can be tilted according to whether the image pixel on the projection area, i.e. the resulting image, is to be bright or dark, so that the light is reflected by the display unit 2 into the projector lens 12 and on to the projection area, not shown in the diagram, or away from the projector lens 12 and into an absorber, also not shown. The column of mirrors bounded by the controllable elements M1, M6 is associated with a column of pixels P1, P2, P3, P4, P5, P6, indicated schematically in the diagram. Each controllable element in the display unit is switched a number of times during a video time frame to obtain the required level of intensity for the associated pixel. The switching sequence for a mirror of the display unit is given in this example by a four-bit binary number (often, the switching sequences have 8-10 bits or more). In the diagram, the column of binary numbers is associated with the corresponding column of mirrors, such that the value of '0000' is associated with the topmost mirror M6 and the pixel P6, and the value '1111' is associated with the bottom mirror M1 and therefore also the pixel P1. The value '1001' is assigned to the second mirror from the bottom and corresponds to the pixel P2, and so on. As already explained, higher-value bits (in this case, bits toward the left of the binary number in the usual notation) are accorded a greater proportion of the video frame time, so that the higher-value bit '1' of the binary number '1001' causes the corresponding mirror to be 'on' for approximately half of the video frame time, whereas the lower-value bit '1' of the same binary number switches the mirror 'on' for only a short duration. In other words, rendering of the different brightness levels in a single frame is effected with the aid of a pulse-width modulation method. Both '0's of that binary number cause the corresponding mirror to be turned 'off' for the associated duration. This is indicated schematically by the 'bars' during the video frame time VT. The projection area can thus be used as a dimmable component to darken or dim an image being projected. An example of such a projector system is the DLP®-System of Texas Instruments®. Naturally, the invention is not limited to just one kind of projector system, but can be used with any other kind of projector system.

Figure 3:
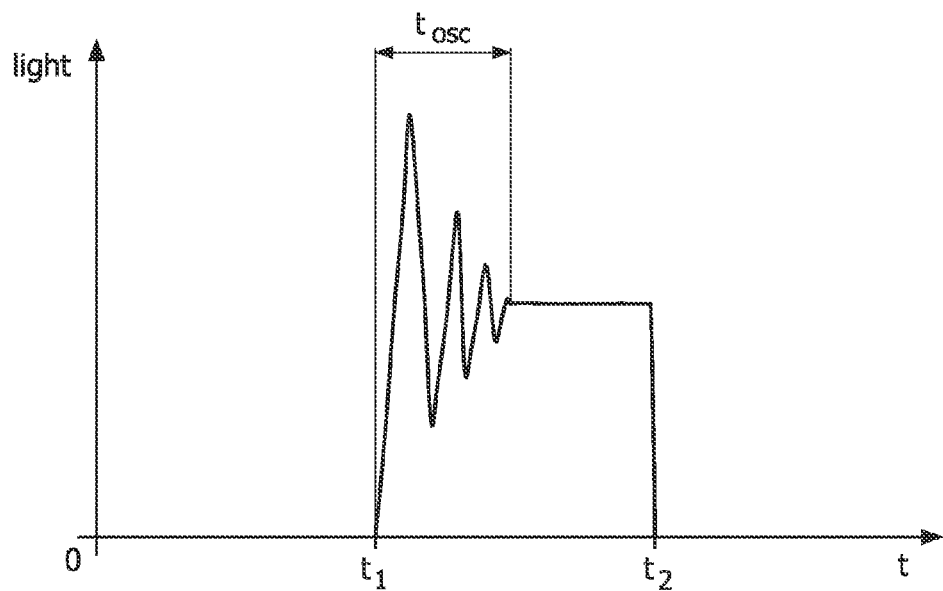
FIG. 3 shows the switching characteristics of a solid-state light source driver.

As already explained, the switching characteristics of the switching circuitry for a solid-state light source such as an LED or laser diode are such that significant fluctuations in light output are generated directly after switch-on, as shown in FIG. 3. Here, an LED is switched on at time $t_1$ using a switched power supply such as a buck converter, and switched off at time $t_2$ give a light pulse LP. The light output of the LED oscillates considerably for a duration $t_{osc}$ before settling to the desired level, indicated by the dashed line. When turned off, the light output of the LED drops essentially instantaneously to zero. In the method according to the invention, the light pulse LP is arranged with respect to a switching sequence of the display unit so that that part of the light pulse LP in which the oscillations occur does not coincide with a short segment of the switching sequence.

Figure 4:
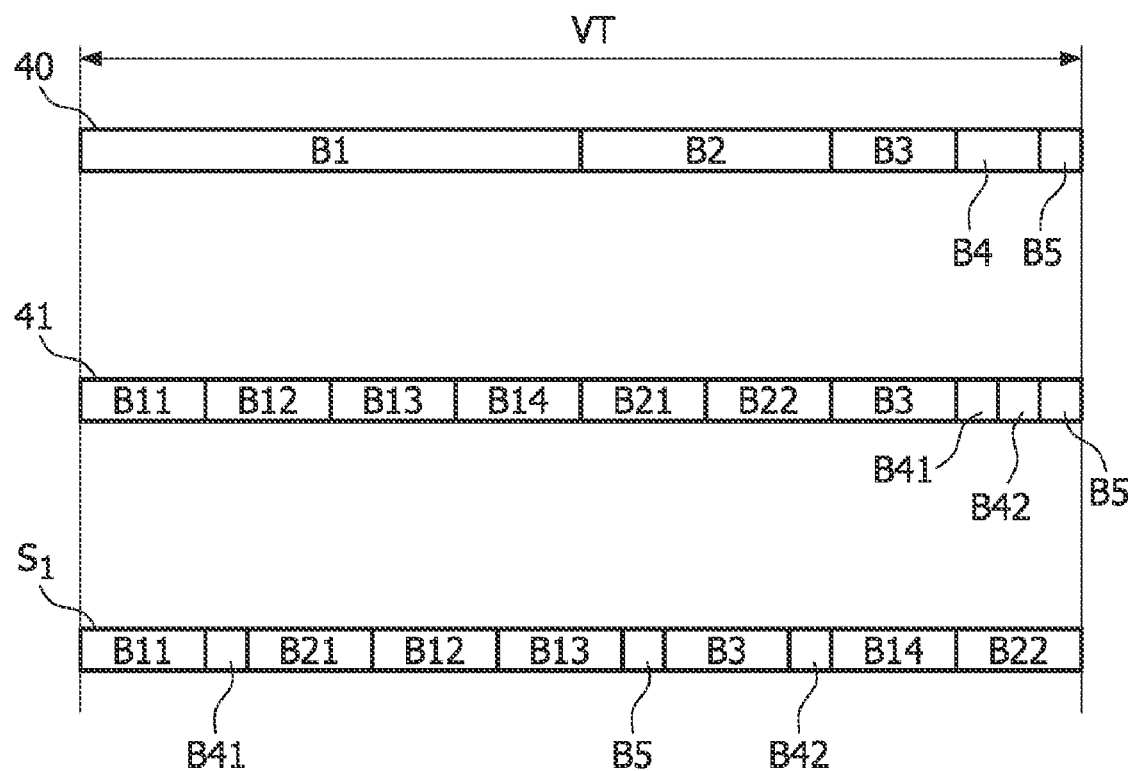
FIG. 4 shows a switching sequence for a display unit of a projector system.

FIG. 4 shows a switching sequence $S_1$ for the controllable elements of a display unit in a video frame time VT. To aid understanding, a bit sequence 40 is shown, which shows the proportions of the video frame time VT that are allocated to each of the bits B1, B2, B3, B4, and B5 of the binary control value. For the sake of simplicity, a bit sequence comprising only five bits is shown. In practice, such a bit sequence could have 8 to 14 bits, according to the image rendering qualities of the display unit. As can be seen from the diagram, each bit of the bit sequence is essentially twice as long as the following bit, so that, for example, B1 is twice as long as B2. In the sequence 41, the longer bits of the bit sequence 40, in this case bit B1 and bit B2 have been subdivided more or less evenly to give subdivisions or segments B11, B12, B13, B14, B21, B22, where the notation 'B12' indicates the second sub-division of bit B1, and 'B21' indicates the first sub-division of bit B2, etc. The bit B4 is also subdivided into two segments B41, B42. Bit B3 is left whole. The segments B11, B12, B13, B14, B21, B24, B41, B42 are then rearranged with the undivided segments B3, B5 over the video frame time VT to give the switching sequence $S_1$, in which the 'short' segments B41, B42, B5 are interspersed with the 'long' segments B11, B12, B13, B14, B21, B24, B3. In a switching sequence compiler according to the invention, a segment is classified as 'long' or 'short' according to its duration or length, and whether this duration is longer or shorter than a predefined threshold. Here, the predefined threshold is the minimum duration or length of a light pulse of the light source divided by the minimum required dim level. This ensures that each 'long' segment is of a length such that, at the lowest dimming level, the light pulse has settled by the time the segment ends. Alternatively, the predefined threshold for a certain light source can be a multiple of its oscillation duration $t_{osc}$ as described in FIG. 3.

Figure 5A:
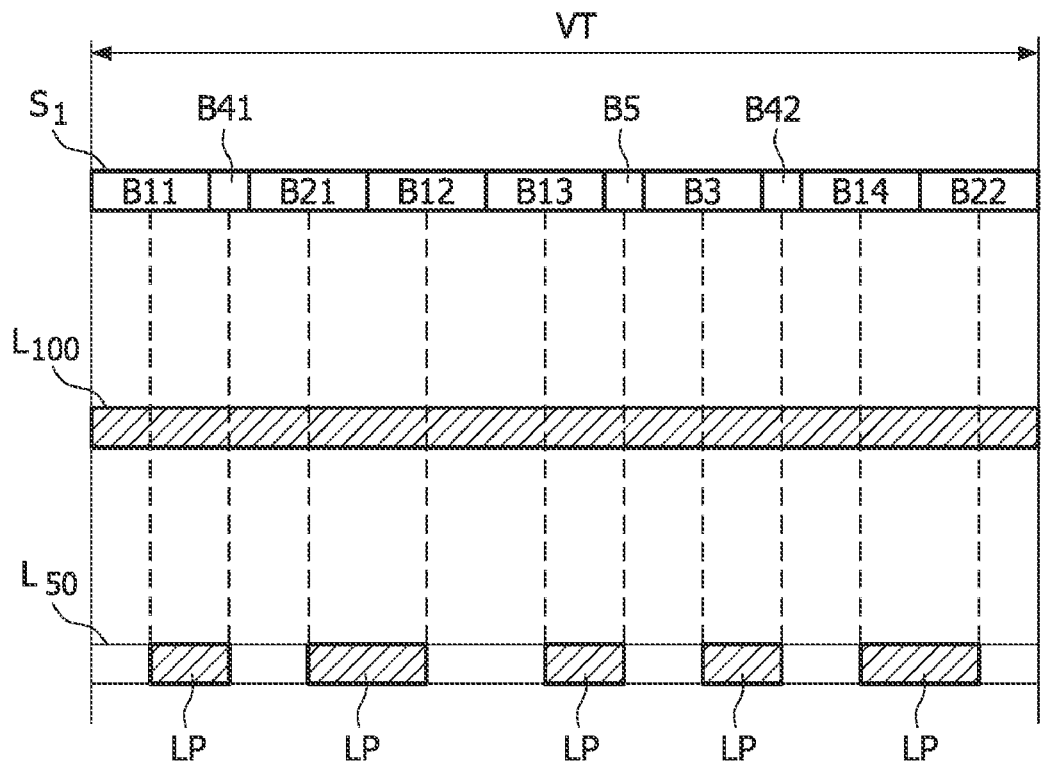
FIG. 5a shows the switching sequence of FIG. 4 with a first light pulse sequence according to the invention to provide 50% light output.

In FIG. 5a, the switching sequence $S_1$ of FIG. 4 is shown, with a light pulse sequence $L_{50}$ according to the invention to provide 50% light output. The shaded bar $L_{100}$ is included for illustrative purposes and indicates full, or 100%, light output. When operating at full light output, the light source is constantly switched on. At 50% light output, the light source is pulsed in a light pulse sequence $L_{50}$ such that the net light output over the video frame time is 50% of full light output. Furthermore, the segments B11, B41, B21, B12, B13, B5, B3, B42, B14, B22 of the switching sequence $S_1$ are each 'covered' by 50% of a light pulse LP, as indicated by the vertical dashed lines. As can be clearly seen from the diagram, the short segments B41, B5, B42 are each only covered to one half of their length by the end of a light pulse LP, and these light pulses LP begin in the preceding longer segments B11, B13, B3 respectively.

Figure 5B:
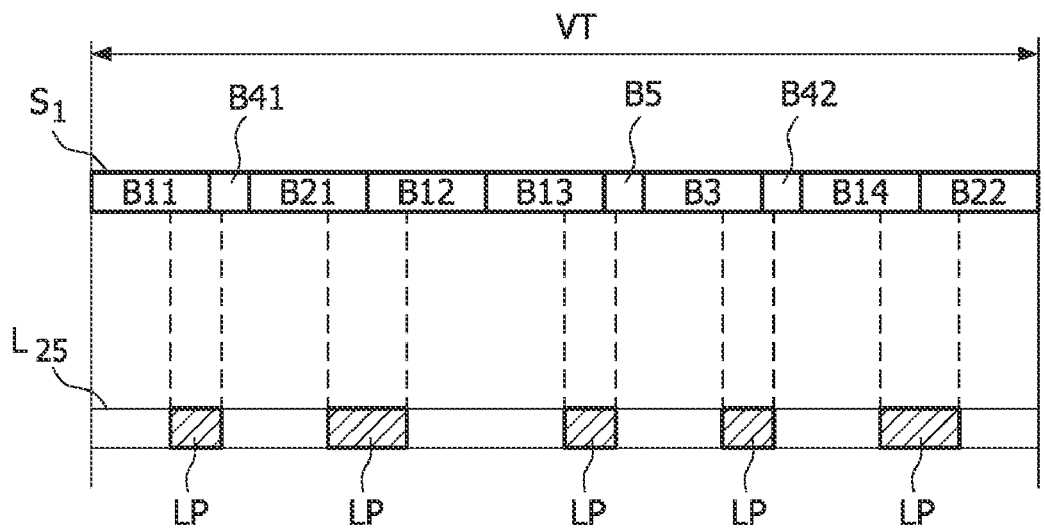
FIG. 5b shows the switching sequence of FIG. 4 with a second light pulse sequence according to the invention to provide 25% light output.

FIG. 5b shows the switching sequence $S_1$ with a light pulse sequence $L_{25}$ to provide 25% light output. In this case, the durations of the light pulses LP of the light pulse sequence $L_{25}$ are such that the segments B11, B41, B21, B12, B13, B5, B3, B42, B14, B22 of the switching sequence $S_1$ are covered by 25% of a light pulse LP. Again, this is indicated by the vertical dashed lines. This diagram also shows clearly that light pulses LP end in the short segments B41, B5, B42 and begin in the preceding segments.

In a system with a white light source used in conjunction with, for example, a colour wheel, the switching sequences of FIGS. 4, 5a and 5b can simply be repeated for each colour, so that red, green and blue images are generated sequentially.

Figure 6:
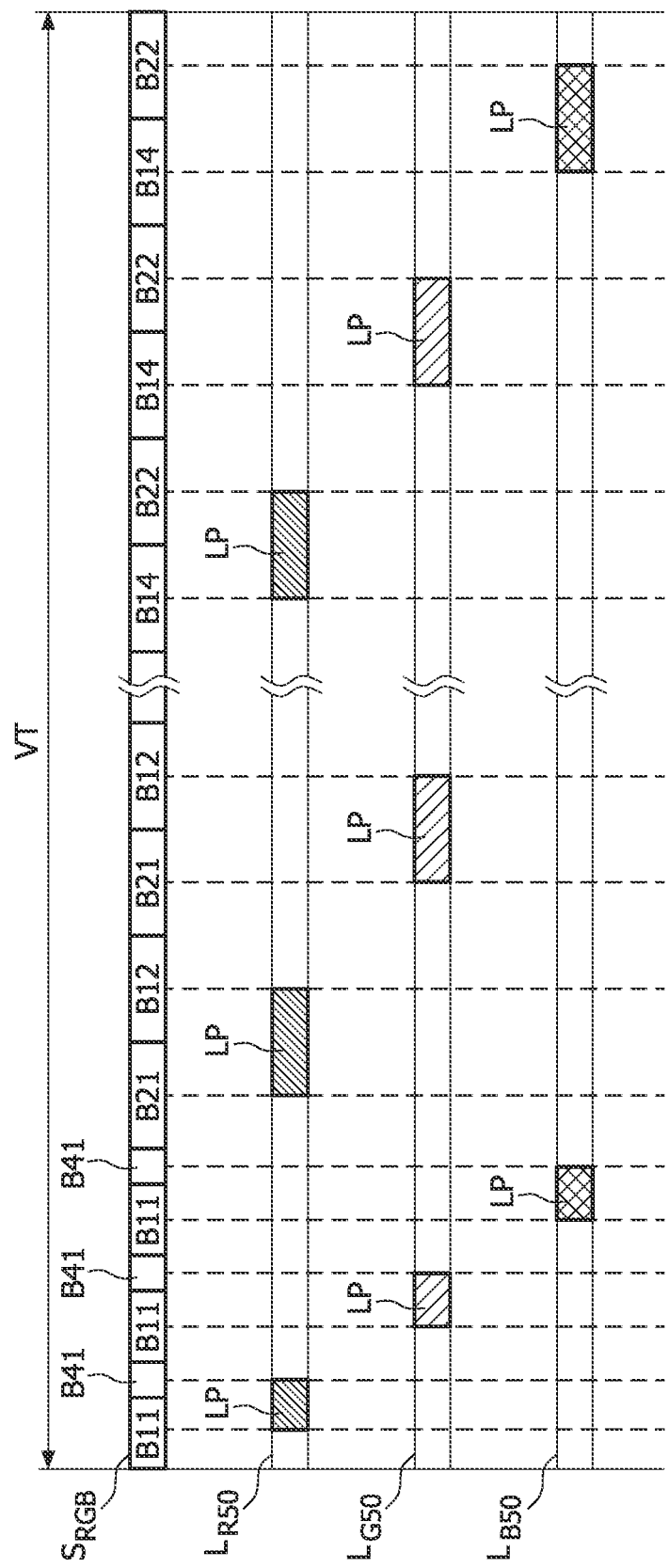
FIG. 6 shows a second switching sequence with a third light pulse sequence according to the invention to provide 50% light output.

FIG. 6 shows a second switching sequence $S_{RGB}$, this time for a number of different coloured solid-state light sources. Here, the video frame time VT again gives the duration of a video frame. Evidently, the switching sequence for a colour can only be one third of the duration of the switching sequence for a white light source. A five-bit switching sequence as described under FIG. 4 is compiled for each colour—red, green and blue—and these three switching sequences are interleaved by repeating identical parts of the switching sequences to give a combined switching sequence $S_{RGB}$ to fill the video frame time VT. The first part of the combined switching sequence $S_{RGB}$ shown in the diagram comprises the segments B11, B41 repeated for the red, green and blue light source respectively, followed by the segments B21, B12 repeated, and so on. The light pulse sequences $L_{R50}$, $L_{G50}$, $L_{B50}$ show the light pulses LP for each of the red, green and blue light sources operating at 50% of full light output.

Figure 7:
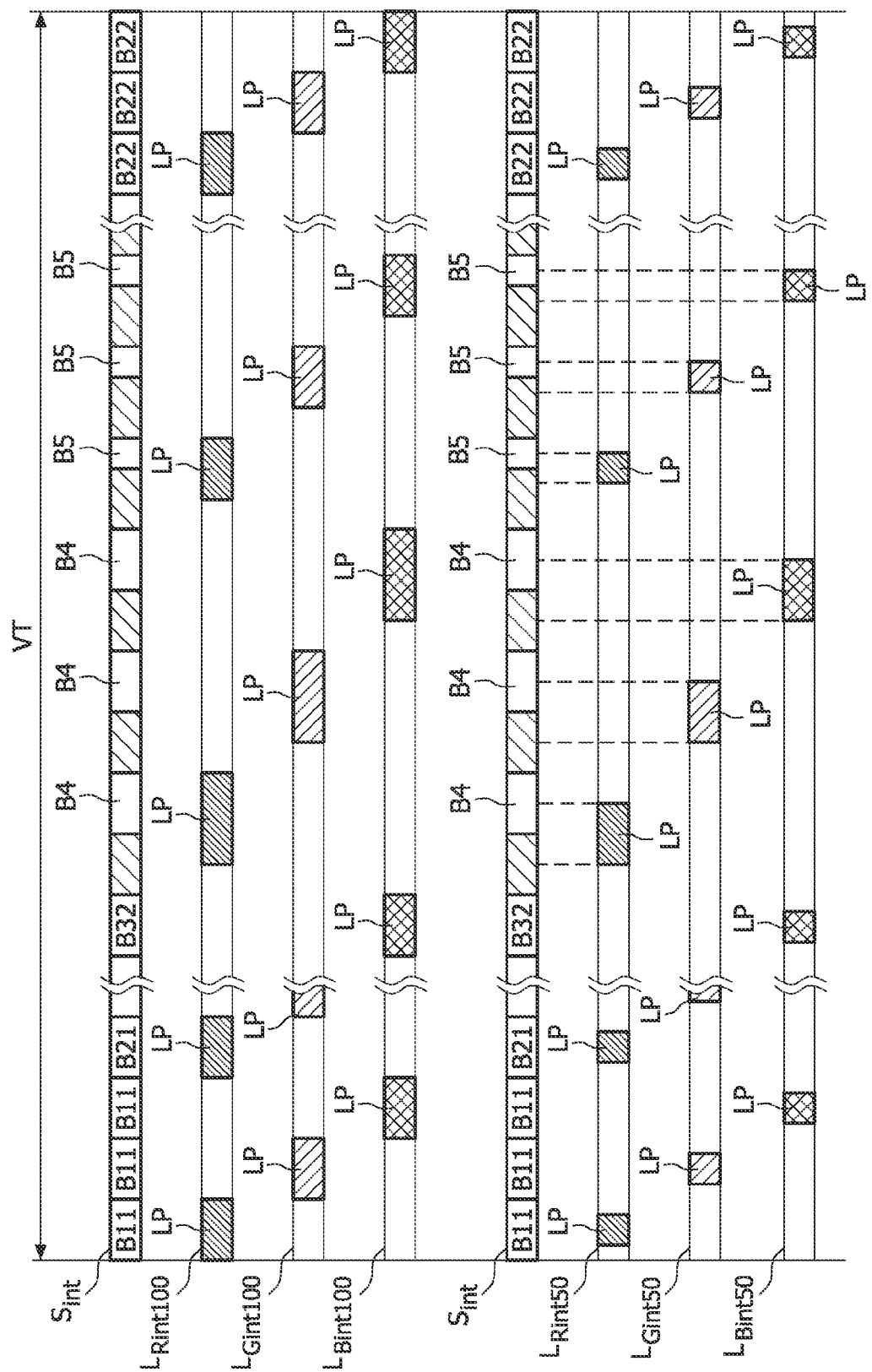
FIG. 7 shows a fourth switching sequence.

FIG. 7 shows a third switching sequence $S_{int}$, which essentially consists of three interleaved switching sequences for three different coloured light sources as described under FIG. 6 above, and in which the long segments of the switching sequence are grouped together. Owing to the limitations of the illustration, the 'long' bits B11, B21, B22, B32 cannot be shown to scale, so that they appear to be of the same length as the 'short' bits B4. In reality, the durations of these long bits would be considerably greater. The short segments of the switching sequence $S_{int}$ are arranged so that individual short segments or clusters of short segments are separated by intervals or pauses (indicated by cross-hatching in the switching sequence $S_{int}$ in the diagram). In these intervals, the mirrors are turned to their 'off' positions. The light pulse sequencer generates light pulses LP for the individual colours so that the activation of a light pulse LP falls within a long segment or within an interval between groups of segments, thus ensuring that the oscillations which appear upon switch-on of the light sources do not fall within short segments of the switching sequence $S_{int}$. The sequences $L_{Rint100}$, $L_{Gint100}$, $L_{Bint100}$ indicate the activation and deactivation of the respective red, green and blue light sources at full power. Each of the segments is covered to 100% by light of the appropriate colour. Below these, the switching sequence $S_{int}$ is shown again for clarity, and light pulse sequences $L_{Rint50}$, $L_{Gint50}$, $L_{Bint50}$ show light pulses LP at 50% power for the different light sources. Each of the longer segments, for example segments B11, B22, are covered to 50% with a light pulse LP of the appropriate light pulse sequence $L_{Rint50}$, $L_{Gint50}$, $L_{Bint50}$. For the short segments B4, B5, the light pulses LP are generated such that the activation of the light pulse LP falls within the interval (the shaded areas between segments), and the segment B4, B5 is covered to 50% of the light pulse LP before this is deactivated.

Figure 8:
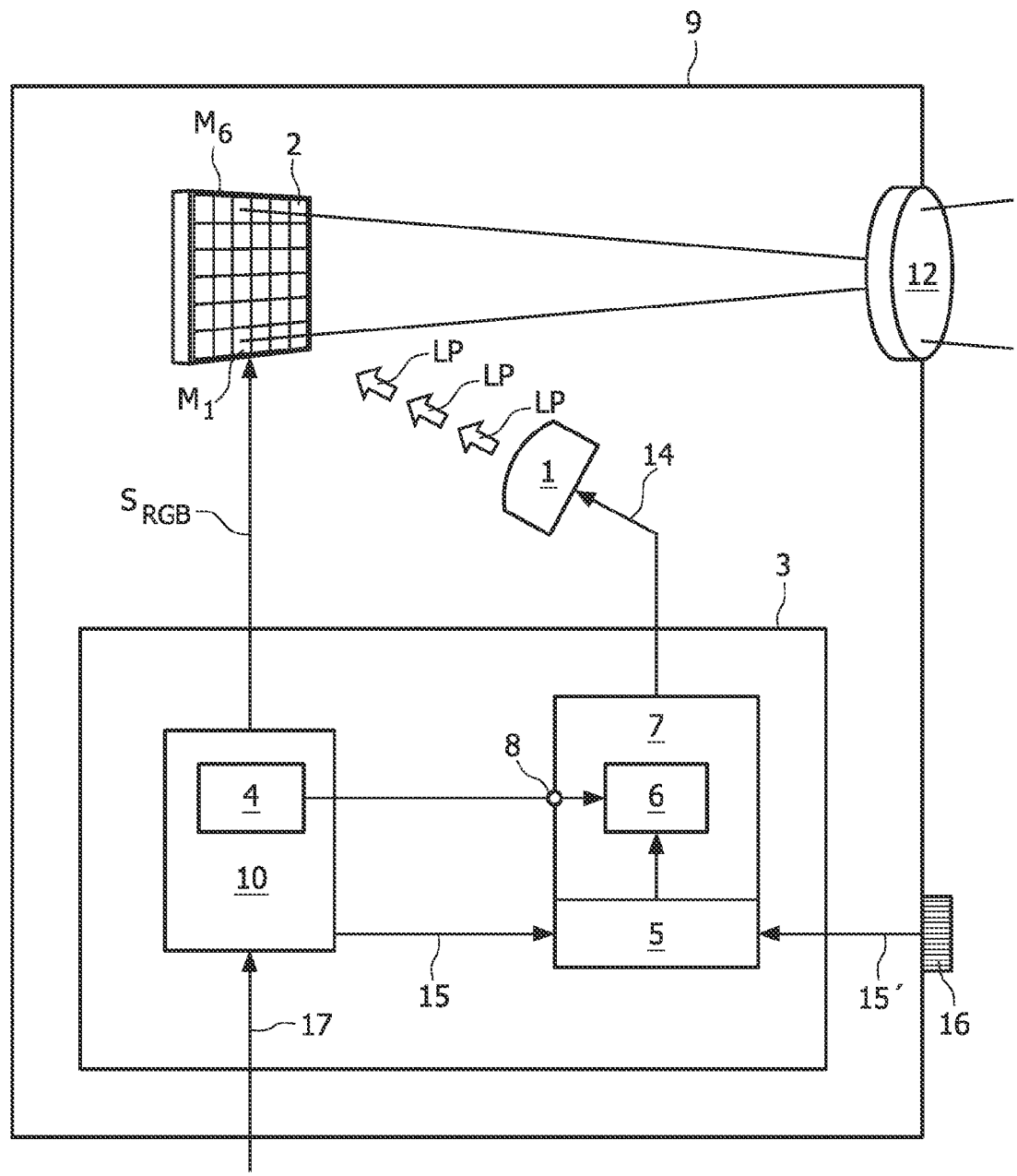
FIG. 8 shows a system according to a first embodiment of the invention for adjusting the light output of a projector system.

FIG. 8 shows a system 3 for adjusting the light output of a projector system 9. The components of FIG. 1 are shown in context, namely the display unit 2, the light source 1, and the projector lens 12 required to focus the light from the display unit 2 onto a projection area, not shown in the diagram. The light source 1 in this embodiment is assumed to be a composite light source comprising three different coloured LEDs, namely red, green and blue.

A display unit controller 10 is provided with video data 17 from a source of video data such as a television receiver, a DVD player, etc., and can perform the necessary steps to prepare the video data for rendering by the display unit 2. The display unit controller 10 in this embodiment also comprises a switching sequence compiler 4 for issuing the switching sequence $S_{RGB}$, or control bit sequence, to the display unit 2 in order to switch the controllable elements M1, M6 (again, only these two are mentioned for the sake of clarity). Information regarding the switching sequence is also forwarded to a light source driving arrangement 7 by means of a suitable interface 8, so that a light pulse sequencer 6 of the light source driving arrangement 7 can issue appropriate signals 14 to cause the light source 1 to generate red, green and blue light pulses LP synchronous to the switching sequence $S_{RGB}$. The durations of the light pulses LP are governed by the fraction by which the light output is to be dimmed. Part of the dimming can be achieved by the switching sequence $S_{RGB}$, and the remaining required dimming is indicated to an interface 5 of the light source driving arrangement 7 as a light output adjustment signal 15. The light output of the light source can also be externally specified by means of an adjustment knob on the projection system 9. Such a light output adjustment signal 15' is also forwarded to the interface 5 of the light source driving arrangement 7.

Figure 9:
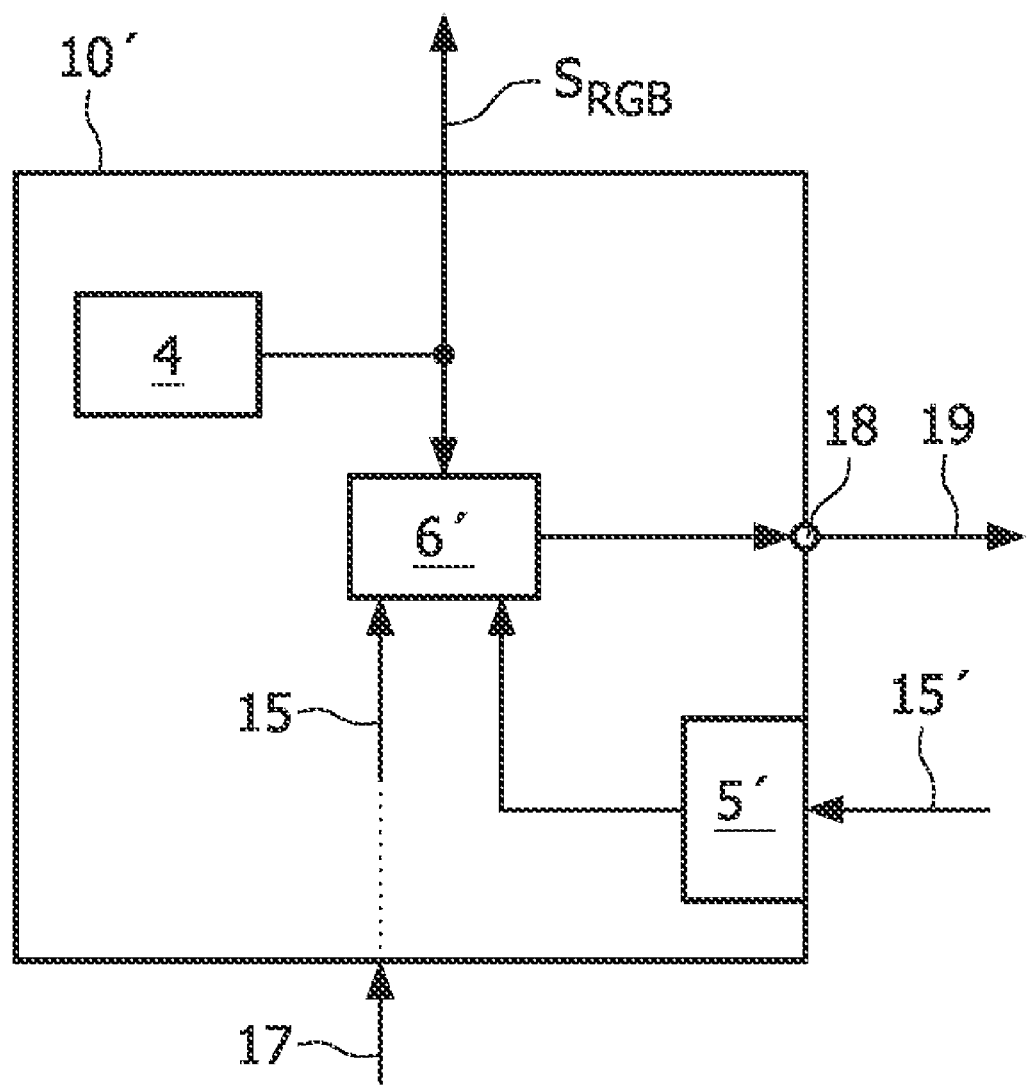
FIG. 9 shows a display unit controller for use in a system according to a second embodiment of the invention for adjusting the light output of a projector system.

Equally, the light pulse sequencer 6 could be realised as a separate arrangement instead of being realised in the light source driving arrangement 7, or it could be incorporated directly in a display unit controller 10', as shown in the alternative embodiment of FIG. 9. Here, a light pulse sequencer 6' is incorporated in a display unit controller 10' for a projector system, together with a switching sequence compiler 4 for generating a switching sequence $S_{RGB}$ as described above, and an interface 5' for obtaining a light output adjustment measure 15' from an external source such as a control knob of the projector system. An additional interface, not shown in the diagram, obtains a light output adjustment measure from the video data. The light output adjustment measure is used by the light pulse sequencer 6' to adjust the light output of a light source of the projector system in accordance with the switching sequence $S_{RGB}$. In this embodiment, an external light source driving arrangement (not shown in the diagram) receives the appropriate control signals 19 issued from the display unit controller 10' by means of an appropriate output 18.

Although the present invention has been disclosed in the form of preferred embodiments and variations thereon, it will be understood that numerous additional modifications and variations could be made thereto without departing from the scope of the invention. For example, in a projector system using red, blue and green LEDs, a display unit can comprise a three-panel design in which a separate display unit is used for each colour. In such a design, a red, a blue and a green image can be generated simultaneously and be combined optically to give a single image. The switching sequences for the separate panels or display units can then run simultaneously, while the different LEDs are switched according to a light pulse sequence as disclosed above.

For the sake of clarity, it is also to be understood that the use of "a" or "an" throughout this application does not exclude a plurality, and "comprising" does not exclude other steps or elements. Also, a "unit" or "module" may comprise a number of blocks or devices, unless explicitly described as a single entity. The values of '1' and '0' in the description have been used to correspond to 'on' and 'off' positions of a controllable element in a display unit, but could equally well be used to bring the controllable element into the 'off' or 'on' position, respectively. The assignation of '1' to 'on' and '0' to 'off' is purely arbitrary and not in the least restrictive.

The invention claimed is:

1. A method of adjusting a light output of a projector system comprising a light source and a display unit with controllable elements for controlling a path of light originating from the light source, the method comprising:
    compiling a switching sequence for the controllable elements of the display unit, the switching sequence comprising long segments and short segments, whereby a long segment is of a duration greater than or equal to a predefined threshold and a short segment is of a duration less than the predefined threshold;
    obtaining a light output adjustment measure by which the light output of the light source is to be adjusted;
    generating a light pulse sequence such that the duration of a light pulse of the light pulse sequence during a segment of the switching sequence corresponds to the light output adjustment measure;
    arranging the light pulse relative to the switching sequence such that the activation of the light pulse does not occur during a short segment of the switching sequence; and
    wherein the predefined threshold is defined as time duration of the light pulse at a lowest dimming level such that the light pulse has settled by the time the long segment ends.

2. A method according to claim 1, wherein the predefined threshold for differentiating between long segments and short segments is based on characteristics of the light source and/or a light source driver of the projector system.

3. A method according to claim 1, wherein the predefined threshold is based on the adjustment measure for the light output of the light source.

4. A method according to claim 1, wherein the activation of the light pulse occurs during a long segment of the switching sequence.

5. A method according to claim 1, wherein a short segment of the switching sequence is preceded by a long segment of the switching sequence.

6. A method according to claim 1, wherein the activation of the light pulse occurs during an interval between two segments of the switching sequence.

7. A method according to claim 1, wherein switching sequences for a plurality of different coloured light sources are interleaved to give a combined switching sequence.

8. A method according to claim 1, wherein the light source comprises a plurality of light-emitting diodes and/or laser diodes.

9. A system for adjusting the light output of a projector system comprising a light source and a display unit with controllable elements for controlling the path of the light originating from the light source, comprising
    a switching sequence compiler for compiling a switching sequence for the controllable elements of the display unit, which switching sequence comprises long segments and short segments, whereby a long segment is of a duration greater than or equal to a predefined threshold and a short segment is of a duration less than the predefined threshold;
    an interface for obtaining a light output adjustment measure by which the light output of the light source is to be adjusted;
    a light pulse sequencer for generating a light pulse sequence such that the duration of a light pulse of the light pulse sequence during a segment of the switching sequence corresponds to the light output adjustment measure, and for arranging the light pulse relative to the switching sequence such that the activation of the light pulse does not occur during a short segment of the switching sequence; and
    wherein the predefined threshold is defined as time duration of the light pulse at a lowest dimming level such that the light pulse has settled by the time the long segment ends.

10. A light source driving arrangement for a light source in a projector system comprising:
    an interface for obtaining a light output adjustment measure by which the light output of the light source is to be adjusted;
    an interface for obtaining a switching sequence of a display unit of the projector system, which switching sequence comprises long segments and short segments;
    a light pulse sequencer for generating a light pulse sequence such that the duration of a light pulse of the light pulse sequence during a segment of the switching sequence corresponds to the light output adjustment measure, and for arranging the light pulse relative to the switching sequence such that the activation of the light pulse does not occur during a short segment of the switching sequence and is of a duration less than a predefined threshold; and
    wherein the predefined threshold is defined as time duration of the light pulse at a lowest dimming level such that the light pulse has settled by the time the long segment ends.

11. A display unit controller for controlling a display unit of a projector system, which display unit controller comprises:
    an interface for obtaining video data;
    a switching sequencer for generating a switching sequence for the display unit of the projector system based on the video data, which switching sequence comprises long segments and short segments;
    an interface for obtaining a light output adjustment measure by which the light output of a light source of the projector system is to be adjusted;
    a light pulse sequencer for generating a light pulse sequence such that the duration of a light pulse of the light pulse sequence during a segment of the switching sequence corresponds to the light output adjustment measure, and for arranging the light pulse relative to the switching sequence such that the activation of the light pulse does not occur during a short segment of the switching sequence and is of a duration less than a predefined threshold;
    a signal output for outputting the light pulse sequence control signal to a light source driving arrangement, which light source driving arrangement controls the light source; and
    wherein the predefined threshold is defined as time duration of the light pulse at a lowest dimming level such that the light pulse has settled by the time the long segment ends.

* * * * *